United States Patent [19]
Scott

[11] 4,191,884
[45] Mar. 4, 1980

[54] DETERMINATION OF WATER SATURATION IN SUBSURFACE EARTH FORMATIONS ADJACENT WELL BOREHOLES

[75] Inventor: Hubert D. Scott, Houston, Tex.

[73] Assignee: Texaco Inc., White Plains, N.Y.

[21] Appl. No.: 865,052

[22] Filed: Dec. 27, 1977

[51] Int. Cl.² .................................................. G01V 5/00
[52] U.S. Cl. ..................................... 250/270; 250/269
[58] Field of Search ................ 250/262, 269, 270, 256

[56] References Cited

U.S. PATENT DOCUMENTS

| | | | |
|---|---|---|---|
| 3,219,820 | 11/1965 | Hall | 250/270 |
| 3,240,938 | 3/1966 | Hall | 250/270 |
| 4,002,903 | 1/1977 | Pitts et al. | 250/270 |

*Primary Examiner*—Bruce C. Anderson

*Attorney, Agent, or Firm*—Carl G. Ries; Thomas H. Whaley; William J. Beard

[57] ABSTRACT

Gamma ray spectra of earth formations surrounding a well borehole are obtained by bombarding the formations with neutrons from a pulsed neutron source and detecting the gamma rays resulting from capture of thermalized neutrons in the formation using a germanium gamma ray detector. A measure of the ratio of chlorine to hydrogen is obtained from the detected gamma radiation spectra, and the apparent formation water salinity is determined from the chlorine/hydrogen ratio. The water saturation of the formation is then obtained from the apparent formation water salinity and the true formation water salinity. Compensation is made for the presence of saline water in the borehole fluid and in the cement annulus, as well as for any bound water in the formation.

17 Claims, 6 Drawing Figures

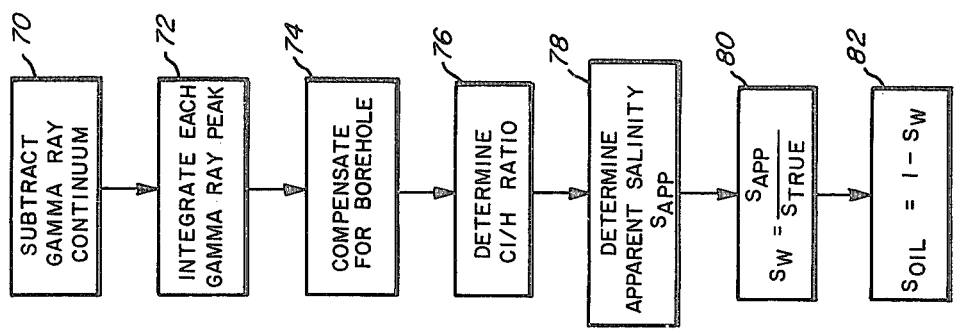
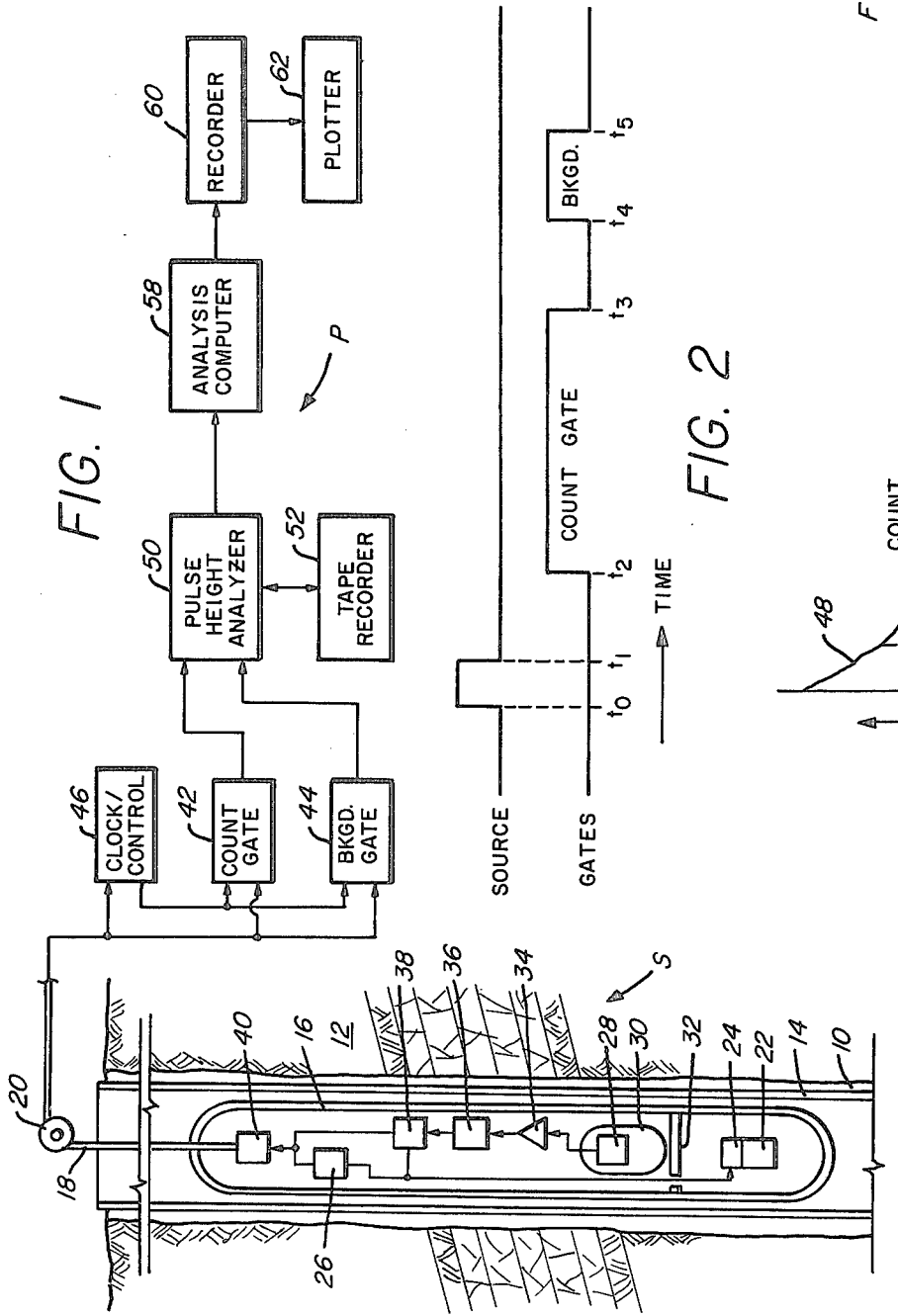

ced well boreholes. The accurate determination of water saturation in reservoir formations was a requisite to determining oil saturation for locating new reserves in old wells. A high degree of accuracy was particularly important when determining whether or not to commence expensive enhanced recovery projects. It was a desirable goal to determine oil saturation to within ±3 saturation units.

DETERMINATION OF WATER SATURATION IN SUBSURFACE EARTH FORMATIONS ADJACENT WELL BOREHOLES

BACKGROUND OF THE INVENTION

1. Field of Invention

The present invention relates to determination of water saturation in subsurface formations surrounding a well borehole using radioactivity well logging.

2. Description of Prior Art

In evaluating reservoirs as possible candidates for enhanced recovery programs, it is important to determine residual oil saturation of the earth formations adjacent well boreholes. The accurate determination of water saturation in reservoir formations was a requisite to determining oil saturation for locating new reserves in old wells. A high degree of accuracy was particularly important when determining whether or not to commence expensive enhanced recovery projects. It was a desirable goal to determine oil saturation to within ±3 saturation units.

In the past, pulsed neutron sources have been used to bombard the formations and measure from the response of the formations the macroscopic thermal neutron capture cross section, $\Sigma$, of the formation. When the formation porosity, shale fractional volume and thermal neutron capture cross-section of the shale and rock matrix were known, the thermal neutron capture cross-section of the fluid, $\Sigma_f$, could be determined. From the value of $\Sigma_f$, a measure of water saturation was obtained. However, errors in the values of the parameters used in determining water saturation limited the accuracy of this method.

Log-inject-log techniques have been developed to eliminate some of the parameters in determining residual oil saturation. These techniques involved successive logging after modification of the formation fluids by various injection methods. However, the accuracy of these techniques was still less than desirable.

Another method of determining water saturation is disclosed in U.S. Pat. Nos. 3,930,153 and 3,930,154, of which Applicant is inventor, which utilized capture gamma spectroscopy logging. A NaI (Tl) gamma ray detector sensed gamma radiation from thermalized neutrons originally emitted by a pulsed neutron source. The gamma ray spectra of the formation were recorded and then analyzed for the presence of chlorine and hydrogen. The analysis was complex, requiring a least squares fit of the formation spectra to a postulated formation spectra.

SUMMARY OF INVENTION

Briefly, the present invention provides a new and improved method of determining the water saturation of an earth formation surrounding a well borehole. From the water saturation, the oil saturation or relative presence of oil in the formation may be determined.

According to the present invention, repetitive pulses of fast neutrons bombard the earth formation, are slowed down and thereafter engage in neutron capture reactions with materials in the vicinity of the borehole. A germanium gamma ray detector obtains gamma ray spectra from thermal neutron capture reactions by chemical elements of the materials in the formation. The gamma ray detector is preferably formed from intrinsic germanium, that is, germanium as pure as is physically realizable, and is cooled to a low temperature, such as approximately $-190°$ C., or near the temperature of solid propane.

The thermal neutron capture gamma ray spectra are then processed to obtain a measure of the relative presence of chlorine to that of hydrogen in the formation. From the measure of the relative presence of chlorine and hydrogen, the apparent water salinity of the formation under investigation is determined. Thereafter, the apparent water salinity and the true water salinity, which may be obtained from well production data or from a formation at a lower depth in the borehole having known water salinity, are used to obtain the water saturation of the formation under investigation.

BRIEF DESCRIPTION OF THE DRAWINGS

FIG. 1 is a schematic block diagram of a well logging system according to the present invention;

FIG. 2 is a timing diagram representing the relative time occurrence of neutron emission times and measurement or count time gates of gamma ray spectra according to the present invention;

FIG. 3 is a diagram of total gamma ray counts, displayed on a logarithmic scale as a function of time;

FIG. 5 is a logic flow diagram of a process suitable for performance in a computer according to the present invention.

DESCRIPTION OF PREFERRED EMBODIMENT

Figure 4:
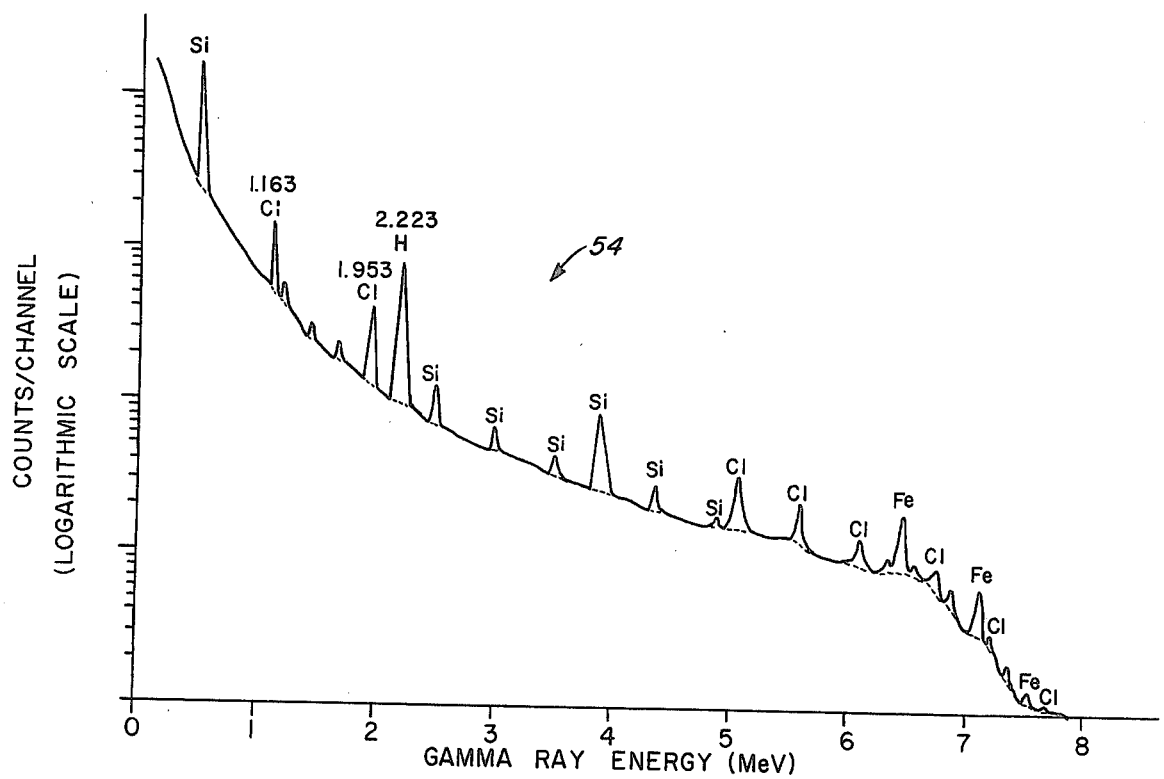
FIG. 4 is a diagram of capture gamma ray counts as a function of their energy levels during the count gate of FIG. 2.

In FIG. 1 of the drawings, the apparatus of the present invention is shown in a borehole 10 in an earth formation 12. The formation 12 is lined in a conventional manner with a steel casing 14 or the like. A well logging system S is, according to the present invention, adapted to examine and investigate water saturation characteristics of the earth formation 12 is shown with portions thereof in the borehole 10.

Considering the logging system S more in detail, an elongated, fluid tight hollow body member or sonde 16 is adapted to be passed longitudinally through the casing 14. A control and processing apparatus designated generally as P, is located at the surface for processing and recording electrical measurements, obtained in a manner to be set forth below, provided by components within the sonde 16. A logging cable 18 is passed over a sheave wheel 20 to support the sonde 16 in the borehole 10. The cable 18 contains one or more conductors for transmitting electrical signals formed in components within the sonde 16 to the surface equipment P.

The sonde 16 contains a source 22 of high energy neutrons. The neutron source preferred for use in the present invention comprises a deuterium-tritium reaction accelerator. However, it should be understood that other neutron sources available for well logging may also be utilized as the source 22 according to the present invention. Examples are Americium-beryllium, actinium[227]-beryllium, and californium[252]. As will be set forth below, according to the present invention, the neutron source 22 is activated to emit high energy neutron pulses for a predetermined interval so that the earth formations 12 are bombarded intermittently by neutrons from the source 22.

The source 22 is connected to a pulsing circuit 24 of conventional design, which is activated periodically by a gating circuit 26, causing the source 22 to emit a pulse of neutrons for a specified time duration beginning at a predetermined time. The pulse of neutrons emitted by the source or accelerator 22 in response to the pulsing circuit 24 and gating circuit 26 irradiates the earth formation 12 intermittently with neutron pulses beginning at a time $t_0$ (FIG. 2) and lasting until a time $t_1$, of typically twenty microseconds, at a frequency of from five hundred to one thousand times per second.

A radiation detector 28 for detecting capture gamma rays resulting from bombardment of the earth formation 12 surrounding the borehole 10 is illustrated schematically in the drawings contained within a vacuum container 30. According to the present invention, the detector 28 is formed from intrinsic germanium. For the purposes of the present invention, intrinsic germanium is defined as germanium which is as close to purity as is physically realizable. The germanium detector 28 is cooled in the vacuum container 30 by a suitable coolant, such as solid propane, to a low temperature such as approximately $-190°$ C., or near the temperature of liquid nitrogen. It is important to note that with an intrinsic germanium detector according to the present invention, it is possible to temperature cycle such crystal. Accordingly, it is no longer necessary to maintain the detector at the low temperature when the sonde 16 is not in use. Further, with the germanium detector 28 according to the present invention, discrete and highly accurate detection of thermal neutron capture gamma ray peaks, when plotted as a function of gamma ray energy, may be obtained, permitting highly accurate processing of the well logging data in the processing apparatus P in order to determine water saturation of the formation 12.

The detector 28 is shielded from the source 22 by a radiation shield 32 of suitable composition, such as a high hydrogen content material containing a combination of lead, iron, lucite plastic, or the like in order to prevent or substantially reduce direct irradiation of the detector 28 as a result of emission of neutrons from the accelerator 22.

The detector 28 generates a voltage pulse which is functionally related to the energy of the gamma rays received so that each pulse generated in the detector 28 has an amplitude functionally related to the energy of the corresponding gamma ray causing such pulse. An amplifier 34 is electrically connected to the detector 28 through suitable seals formed in the vacuum container 30 to amplify the electrical signals formed in the detector 28. A conventional discriminator or bias level circuit 36 may be connected, if desired, to the amplifier 34 in order to reduce spurious signals due to neutron activation of the detector 28 by stray neutrons from the source 22. An amplifier 38 receives the output from the discriminator 36 and is electrically coupled by a suitable conductor to a cable driver amplifier 40 so that output signals from the detector 28, after passing through the amplifier 34 and discriminator 36, are permitted to pass through conductors in the cable 18 to the processing instrumentation P at the surface.

Accordingly, the capture gamma ray response of the earth formation 12 to the pulsed neutrons from the accelerator 22 may be measured at selected time intervals, as will be set forth, relative to the emission of neutrons from the source 22. The cable driving circuit 40 is of conventional function and structure and provides power to transmit the response from the discriminator circuit 36 to the surface instrumentation P. Further, although not shown, it should be understood that conventional power supplies are included in the present invention for operating the surface instrumentation P and the circuitry contained in the sonde 16, as well.

Electrical signals from the downhole sonde 16 passed through the cable 18 are received at a count gate 42 and a background gate 44 operating in response to control signals formed in a surface clock control network 46. The control network 46 is a conventional actuating circuit having circuitry therein to cause emission of timing pulses causing the gates 42 and 44 to operate in synchronism with each other and in synchronism with the gating circuit 26 in the sonde 16. The gates 42 and 44 are individually activated at different times by the control network 46 to permit readings of the thermal neutron capture gamma ray population to be made during time intervals when the detector 28 detects radiation while the accelerator 22 is quiet. The count gate 42 is activated at a time $t_2$ (FIG. 2) sufficiently long after the emission of neutron bursts from the source 22 to permit the rapid absorption effect of the borehole materials to die away, and further to permit the emitted neutrons to reach the thermal energy level before measurements are taken. A suitable example of time $t_2$ after the time $t_0$ would be on the order of four hundred microseconds. The count gate 42 is typically activated for a time on the order of five hundred to seven hundred microseconds.

Background gate 44 is activated at a time $t_4$ sufficiently long after the emission of each neutron burst to permit the thermal neutrons to be substantially all absorbed so that the remaining radiation present in the formation and the tool comprises residual or background radiation. A display curve 48 (FIG. 3) illustrates an example plot of the number of gamma rays, displayed logarithmically as a function of time, present in the borehole 10. The origin time for the display curve 48 occurs at the time $t_0$ (FIG. 2) when the emission of neutrons from the source 22 commences. As is evident from the curve 48, the number of gamma rays rapidly decreases due to borehole effects and thereafter undergoes an exponential decrease due to capture of neutrons during the time interval when the count gate 42 is activated, and thereafter decreases until the time interval when the background gate 44 is activated when only background or residual radiation is present.

The count signals passing through the count gate 42 and background gate 44 are provided to a pulse height analyzer 50 which sorts and accumulates a running total of incoming pulses into memory storage locations based on the height or amplitude of the incoming pulses. The pulse height analyzer 50, as is conventional, forms a cumulative record of the number of pulses occurring at each energy level or channel, typically expressed in Mev. The pulse height analyzer 50 may, if desired, be electrically connected to a suitable recording apparatus 52, such as a tape recorder, in order to store therein the record of the total of incoming pulses accumulated in the pulse height analyzer 50 as a function of depth of the sonde 16 in the borehole 10. In this manner, the signals recorded in the recorder 52 may be returned to the pulse height analyzer 50 for use at a later time or for processing and comparison with other data, if desired.

A display 54 (FIG. 4) indicates an example gamma ray spectrum as a function of Mev energy for gate 42.

Attention is directed to the prominent peaks observed, due to the utilization of the cooled intrinsic germanium detector 28 in the sonde 16, resulting from thermal neutron capture in hydrogen (water and oil), chlorine (salt water), silicon (quartz) and iron (borehole steel casing). Further, the highly pronounced peaks at lower gamma ray energies illustrate the efficiency of the germanium gamma ray detector according to the present invention at lower gamma ray energies.

Thus, with the present invention, highly pronounced and prominent capture gamma ray count peaks are obtained for gamma ray energy levels or channels indicative of particular chemical elements in the well borehole 10 and in the formation 12. These peaks rise exaggeratedly above a continuum or gradually decreasing average indicated by the count levels between peaks and phantom lines beneath the peaks in FIG. 4.

With the present invention, by the use of the cooled germanium detector 28 an analysis computer 58 may process the data stored in the pulse height analyzer 50 in accordance with a sequence of steps (FIG. 5) to obtain a measure of the water saturation of the formation 12 under investigation. A recorder 60 is connected to the computer 58 to form a record of the results of processing so that such results may be available for later use or analysis. A plotter 62 is connected to the recorder 60 so that output records of the water saturation in the formation 12 as a function of depth in the borehole 10 are available for analysis in determining whether to initiate secondary or tertiary recovery operations in the formations of interest. The analysis computer may be, for example, a PDP-11 Minicomputer typically a part of field well logging equipment. Due to the accuracy of the measurements obtained with the detector 28, relatively simple processing is permitted, and field processing of the data is thus possible.

A flow chart F (FIG. 5) sets forth the sequence of steps of controlling the computer 58 in a manner sufficient to enable one of skill in the art to process the data obtained with the detector 28 and stored in the pulse height analyzer 50 by writing computer language instructions, such as in the FORTRAN program language or other suitable computer language to process such data.

During an initial operation step 70 (FIG. 5), the computer 58 extracts the counts for each of the channels in the pulse height analyzer 50 and subtracts the gamma ray continuum, of the type set forth above, from each of such channels, effectively removing all but the peaks detected by the detector 28 from the data to be processed. The background radiation measurement obtained by the gate 44 is also subtracted during the step 70.

The computer 58, under control of an instruction 74 then compensates for iron in the casing and for hydrogen and chlorine in the well borehole 10. Processing under control of instruction 74 by the computer 58 may be accomplished, for example, in accordance with the techniques dislosed in U.S. Pat. No. 3,930,154, so that the effect of iron in the casing and hydrogen and chlorine in the well borehole on the data stored in the pulse height analyzer 50 are removed to permit more accurate measurement of the chlorine and hydrogen in the formation and thus more accurate determination of the water saturation of the formation.

The computer 58, under control of an instruction 76, then determines a measure of the relative presence of chlorine to hydrogen by comparing the area under two gamma ray energy peaks, one for chlorine and one for hydrogen. Due to the efficiency of the germanium detector 28 at low gamma ray energies, suitable peaks for determining the chlorine to hydrogen or Cl/H ratio are to 2.223 Mev peak for hydrogen and the 1.953 Mev peak for chlorine. However, where the formations are known to contain limestone, dolomite, anhydrite or gypsum, and thus calcium, an interfering calcium peak would be present at 1.944 Mev. In this situation, a different chlorine peak, such as a chlorine peak at 1.163 Mev could be used.

Figure 6:
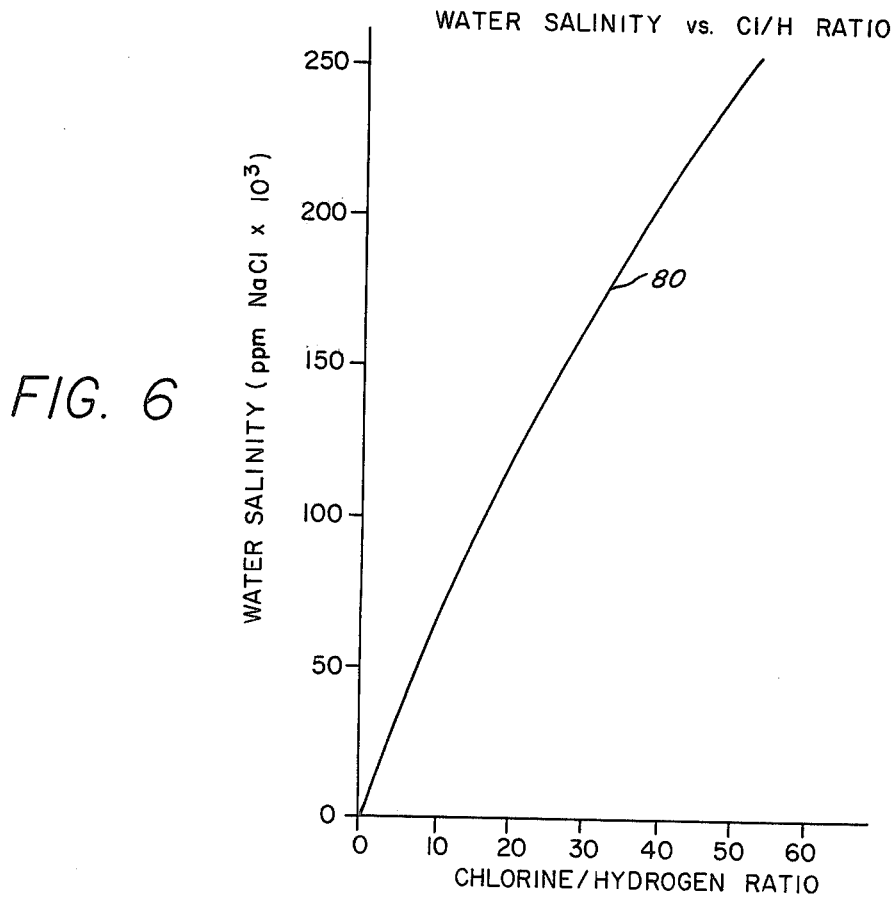
FIG. 6 is a graphical representation of the relation between the chlorine/hydrogen ratio of a formation determined according to the present invention and the water salinity of the formation.

Once the Cl/H ratio has been determined during step 76, the apparent formation water salinity is determined during the step 78. The determination may readily be made by consulting a computer memory location or by reference to a chart 80 (FIG. 6) obtained from a known test formation setting forth water salinity in parts per million as a function of chlorine/hydrogen ratio of salt water.

After the apparent formation water salintiy is determined, the water saturation $S_w$ is then obtained by the computer 58 under control of an instruction 82. Water saturation $S_w$ in a formation is determined by the ratio of the apparent formation water salinity to the true salinity, or expressed as an equation:

$$S_w = \text{apparent salinity}/\text{true salinity}$$

The true salinity may be obtained from production data obtained during production of oil in the well or may be obtained from water salinity readings obtained in a lower zone known to be one hundred percent water saturated. Once the water saturation $S_w$ is obtained in the manner set forth above, and where no gas is present in the reservoir being tested for water saturation, the oil saturation $S_o$ may be obtained by using the following equation:

$$S_o = 1 - S_w$$

Accordingly, the method of the present invention has significant application and impact in determining residual oil saturation in reservoirs to determine which reservoirs are suitable for enhanced recovery programs. Further, since fewer measurements are needed according to the present invention than with the prior art, more accurate measurements may be obtained.

A further and additional advantage to determining water saturation according to the present invention arises from utilization of a ratio, namely Cl/H, rather than computation of a single number. Measurement of such a ratio has advantages over measurement of an absolute quantity since the effect of some factors on the two components on the ratio will cancel each other. For instance, the ratio Cl/H is independent of porosity $\phi$ and also independent of thermal neutron absorbers such as boron and shale.

Where the casing 14 was cased with cement originally mixed with salt water, an additional small correction for salt water bound in the cement annulus around the casing 14 may be desirable. A test to determine the necessity of such a correction can be made by injecting fresh water into the formation being tested to displace the salt water from the formation and from the borehole casing. The source 22 would then be activated and gamma ray spectra obtained utilizing detector 28 and analyzing the spectra so obtained for chlorine peaks. If chlorine peaks are measurable in this condition, such peaks would indicate the presence of salt water in the cement surrounding the casing 16 and compensation made therefor. Further, a small correction to the hydrogen measurement might become necessary if the formation contains a substantial amount of shale, which contains some bound water, but the magnitude of such a correction would be generally insignificant.

It should be understood that the foregoing embodiment is the preferred embodiment of the present invention, although numerous modifications, adjustments, changes in the program language or flow chart format, or the data output format, all coming within the scope of the appended claims, will occur to those of ordinary skill in the art.

I claim:

1. A method of determining the water saturation of an earth formation surrounding a well borehole, comprising the steps of:
    (a) bombarding the earth formation with repetitive pulses of fast neutrons which are slowed down and thereafter engage in neutron capture reactions with materials in the vicinity of the bore hole;
    (b) obtaining by use of a germanium gamma ray detector gamma ray spectra of the materials in the vicinity of the borehole;
    (c) obtaining from the gamma ray spectra a measure of the relative presence of chlorine to that of hydrogen in the formation;
    (d) obtaining a measure of apparent formation water salinity from the measure of relative presence of chlorine to hydrogen in the formation; and
    (e) obtaining the water saturation of the formation utilizing the apparent formation water salinity.

2. The method of claim 1, further including the step of:
    obtaining the oil saturation of the formation from the water saturation.

3. The method of claim 2, further including the step of:
    forming a record of oil saturation as a function of depth in the well borehole.

4. The method of claim 1, further including the step of:
    obtaining a measure of true formation water salinity from a formation of known water saturation.

5. The method of claim 4, wherein said step of obtaining the water saturation of the formation comprises:
    obtaining the ratio of the apparent formation water salinity to the true formation water salinity.

6. The method of claim 1, further including the step of:
    forming a record of water saturation as a function of depth in the borehole.

7. The method of claim 1, further including the step of:
    compensating for the presence of chlorine and hydrogen in the well borehole prior to said step obtaining a measure of the relative presence of chlorine and hydrogen in the formation.

8. The method of claim 1, wherein said step of obtaining gamma ray spectra comprises:
    measuring in the germanium detector the number of gamma ray counts during a first time interval a predetermined time after a pulse of fast neutrons is emitted into the well borehole and formation during said step of bombarding.

9. The method of claim 8, further including the step of:
    compensating for background gamma radiation in the well borehole and formation.

10. The method of claim 3, wherein said step of compensating comprises the steps of:
    (a) measuring the number of background gamma ray counts during a second time interval after the first time interval to obtain the background gamma ray intensity in the borehole and formation; and
    (b) subtracting the background gamma ray counts from the gamma ray counts measured during the first time interval to thereby compensate for background gamma rays in the well borehole and formation.

11. The method of claim 1, wherein the germanium in the gamma ray detector comprises intrinsic germanium.

12. The method of claim 1, further including the step of:
    cooling the detector to a temperature of approximately $-190°$ C. during said step of detecting.

13. The method of claim 1, wherein said step of obtaining a measure of the relative presence of chlorine to hydrogen comprises the step of:
    subtracting the gamma ray continuum from the gamma ray spectra to obtain gamma ray peaks from thermal neutron capture in chemical elements in the formation.

14. The method of claim 13, further including the step of:
    (a) integrating the area under a selected chlorine thermal neutron capture peak;
    (b) integrating the area under a selected hydrogen thermal neutron capture peak; and
    (c) forming a ratio of the area under the chlorine thermal neutron capture peak to the area under the hydrogen thermal neutron capture peak.

15. The method of claim 14, wherein the chlorine thermal neutron capture peak is centered at 1.953 Mev.

16. The method of claim 14, wherein the hydrogen thermal neutron capture peak is centered at 2.223 Mev.

17. The method of claim 14, wherein the formation is postulated to contain calcium minerals and wherein the chlorine thermal neutron capture peak is centered at 1.163 Mev.

* * * * *